(12) United States Patent  
Noda et al.

(10) Patent No.: US 8,687,845 B2  
(45) Date of Patent: Apr. 1, 2014

(54) INFORMATION PROCESSING APPARATUS, METHOD FOR CONTROLLING DISPLAY, AND PROGRAM FOR CONTROLLING DISPLAY

(75) Inventors: Takurou Noda, Tokyo (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 12/859,060

(22) Filed: Aug. 18, 2010

(65) Prior Publication Data

US 2011/0058711 A1     Mar. 10, 2011

(30) Foreign Application Priority Data

Sep. 4, 2009   (JP) ............................. P2009-204957

(51) Int. Cl.
*G06K 9/00*         (2006.01)
*G06K 17/00*        (2006.01)

(52) U.S. Cl.
USPC .......................................... 382/103; 345/418

(58) Field of Classification Search
USPC .......................................... 382/103; 345/418
See application file for complete search history.

(56) References Cited

U.S. PATENT DOCUMENTS

| 2008/0010616 A1* | 1/2008 | Algreatly ...................... 715/856 |
| 2009/0079813 A1* | 3/2009 | Hildreth ..................... 348/14.03 |
| 2009/0201249 A1  | 8/2009 | Yamamoto |
| 2010/0053151 A1* | 3/2010 | Marti et al. .................. 345/419 |

FOREIGN PATENT DOCUMENTS

| JP | S63-231487  | 9/1988 |
| JP | H04-328627  | 11/1992 |
| JP | H08-279998  | 10/1996 |
| JP | H09-247638  | 9/1997 |
| JP | H10-257151  | 9/1998 |
| JP | 2001-157184 | 6/2001 |
| JP | 2009-157919 | 7/2009 |

OTHER PUBLICATIONS

Japanese Patent Office, Notification of Reasons for Refusal, Japanese Patent Application No. 2009-204957, Dec. 11, 2012.

* cited by examiner

*Primary Examiner* — Tom Y Lu
(74) *Attorney, Agent, or Firm* — Finnegan, Henderson, Farabow, Garrett & Dunner, L.L.P.

(57) ABSTRACT

A method, computer-readable storage medium, and apparatus for managing content presented on a display is provided. The method includes receiving signals representing first and second characteristics of a user, presenting first and second images on the display, the first and second images being respectively associated with the first and second characteristics, and presenting association information on the display, the association information indicating an association between the first and second images.

25 Claims, 9 Drawing Sheets

INFORMATION PROCESSING APPARATUS, METHOD FOR CONTROLLING DISPLAY, AND PROGRAM FOR CONTROLLING DISPLAY

CROSS-REFERENCE TO RELATED APPLICATION

This application claims priority of Japanese Patent Application No. 2009-204957, filed on Sep. 4, 2009, the entire content of which is hereby incorporated by reference.

BACKGROUND

1. Technical Field

The present disclosure relates to an information processing apparatus, a method for controlling display, and a program for controlling display, and is suitable for application, for example, to an information processing apparatus implementing a graphical user interface (GUI) that allows a plurality of operators to perform operations simultaneously.

2. Description of the Related Art

A GUI is currently implemented on many of information processing apparatuses. In actuality, such information processing apparatuses are each designed to make, for example, a pointer, which moves on the screen in accordance with an operation performed by an operator, be displayed and allow an icon displayed on the screen to be selected when an arbitrary position on the screen is selected with this pointer.

Moreover, as a pointing device for moving the pointer on the screen, a mouse and a touch pad are commonly used; however, a controller that moves the pointer by detecting motion of the controller in space with a motion sensor has also been proposed. For example, see Japanese Unexamined Patent Application Publication No. 2009-157919.

Many of such information processing apparatuses are designed on the supposition that one screen is operated by one operator.

On the other hand, some of information processing apparatuses such as game machines are designed on the supposition that one screen is operated by a plurality of operators. From now on, such information processing apparatuses are expected to increase.

In actuality, such information apparatuses are designed to make pointers, each of which is allocated to a corresponding one of the operators, be displayed on one screen, and allow each operator to operate his/her pointer and specify an arbitrary location on the screen.

SUMMARY

However, as described above, when a plurality of pointers are made to be displayed on one screen, it is difficult to perceive which operator is operating which pointer. As compared to a case in which one operator performs operations, there is a problem in that the operability decreases.

Accordingly, there is disclosed a method for managing content presented on a display. The method may include receiving signals representing first and second characteristics of a user and presenting first and second images on the display. The first and second images may be respectively associated with the first and second characteristics. The method may also include presenting association information on the display, the association information may indicate an association between the first and second images.

DESCRIPTION

Description of the embodiments is made in the following order:

1. Embodiment
2. Other Embodiments

1. Embodiment

1-1. Overview of Embodiment

First, the overview of the embodiment will be described. For information, after this overview is described, specific examples of the embodiment will be described.

Figure 1:
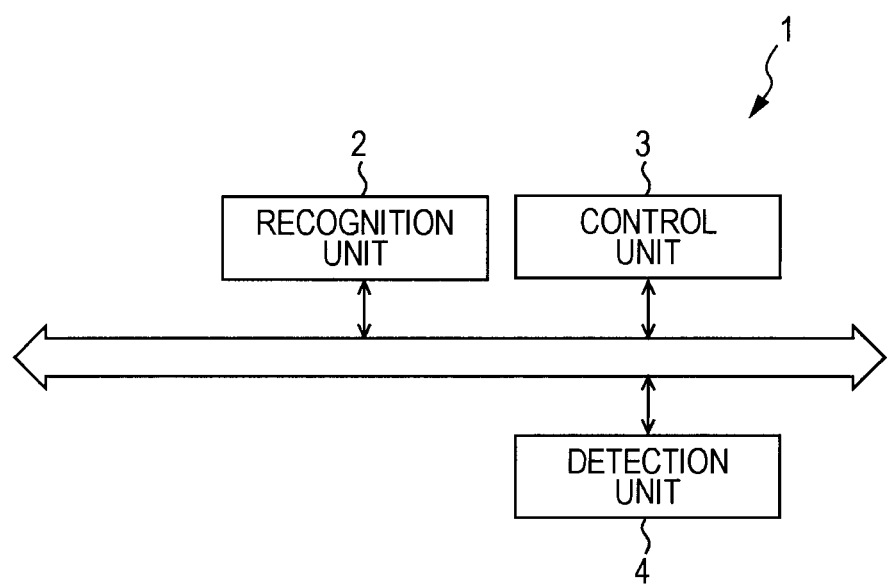
FIG. 1 is a schematic diagram showing the structure of an information processing apparatus, which is an overview of an embodiment.

In FIG. 1, 1 denotes an information processing apparatus. This information processing apparatus 1 is provided with a recognition unit 2 that recognizes an operation body and an instruction from the operation body in such a manner that the operation body and the instruction from the operation body are correlated with each other. Moreover, the information processing apparatus 1 makes a display unit (not shown) display a first image, or display information, indicating the operation body recognized by the recognition unit 2 and a second image, or second information, which is operated in accordance with an instruction from the operation body. Furthermore, the information processing apparatus 1 is provided with a control unit 3 that makes the display unit display association information, or relativity information, indicating relativity between the first display information and the second display information in accordance with the correspondence relationship between the operation body and the instruction from the operation body.

With such a structure, the information processing apparatus 1 can make an operator easily recognize which operation body is operating the second display information (for example, a pointer), which is operated in accordance with an instruction from the operation body (for example, an operator). Thus, even in a case in which, for example, there are a plurality of operation bodies and a plurality of pieces of the second display information are displayed, the information processing apparatus 1 can make operators easily recognize which of the operation bodies are operating which of the pieces of the second display information.

More specifically, the control unit 3 makes, for example, a line connecting the first display information and the second display information be displayed as relativity information. Furthermore, in this case, the control unit 3 may make the line as the relativity information become curved and also become thicker in accordance with an operation performed on the second display information.

Moreover, when no operation is performed on the second display information over a predetermined time, the control unit 3 may also make the second display information be not displayed. Furthermore, in this case, when performing of an operation on the second display information is started, the control unit 3 may make the second display information be displayed at the position of the first display information, and then make the second display information move. When performing of the operation on the second display information is terminated, the control unit 3 may also make the second display information move to the position of the first display information and then make the second display information be not displayed.

Furthermore, the information processing apparatus 1 may also be provided with a detection unit 4 that detects an operator as an operation body from a camera image. In this case, the recognition unit 2 recognizes an operator and an instruction from the operator in such a manner that the operator and the instruction from the operator are correlated with each other in accordance with a first characteristic, or face, of the operator detected by the detection unit 4 and motion of a second characteristic, or hand, of the operator. Furthermore, in this case, the control unit 3 makes a face image of the operator detected by the detection unit 4 be displayed as the first display information, and makes the display position of the second display information move in accordance with the motion of the hand of the operator.

Furthermore, in this case, the control unit 3 may also make the first display information be displayed at a position corresponding to the position, within a camera image, of the operator detected by the detection unit 4.

Furthermore, the recognition unit 2 may also recognize an external appliance as an operation body and an instruction from the external appliance in such a manner that the external appliance and the instruction from the external appliance are correlated with each other in accordance with the external appliance and an input signal from the external appliance.

Furthermore, the recognition unit 2 may also recognize an operation body that outputs an instruction via a network, and an operation body that directly, not via a network, outputs an instruction. In this case, in accordance with a recognition result from the recognition unit 2, the control unit 3 makes the first display information corresponding to the operation body that outputs an instruction, or signal, via the network be displayed in a first display area and makes the first display information corresponding to the operation body that directly, not via a network, outputs an instruction be displayed in a second display area.

Specific examples of the information processing apparatus 1 having such a structure will be specifically described in the following.

1-2. Specific Examples of Embodiment

[1-2-1. Structure of Multiple-Operator Simultaneous-Operation System]

Figure 2:
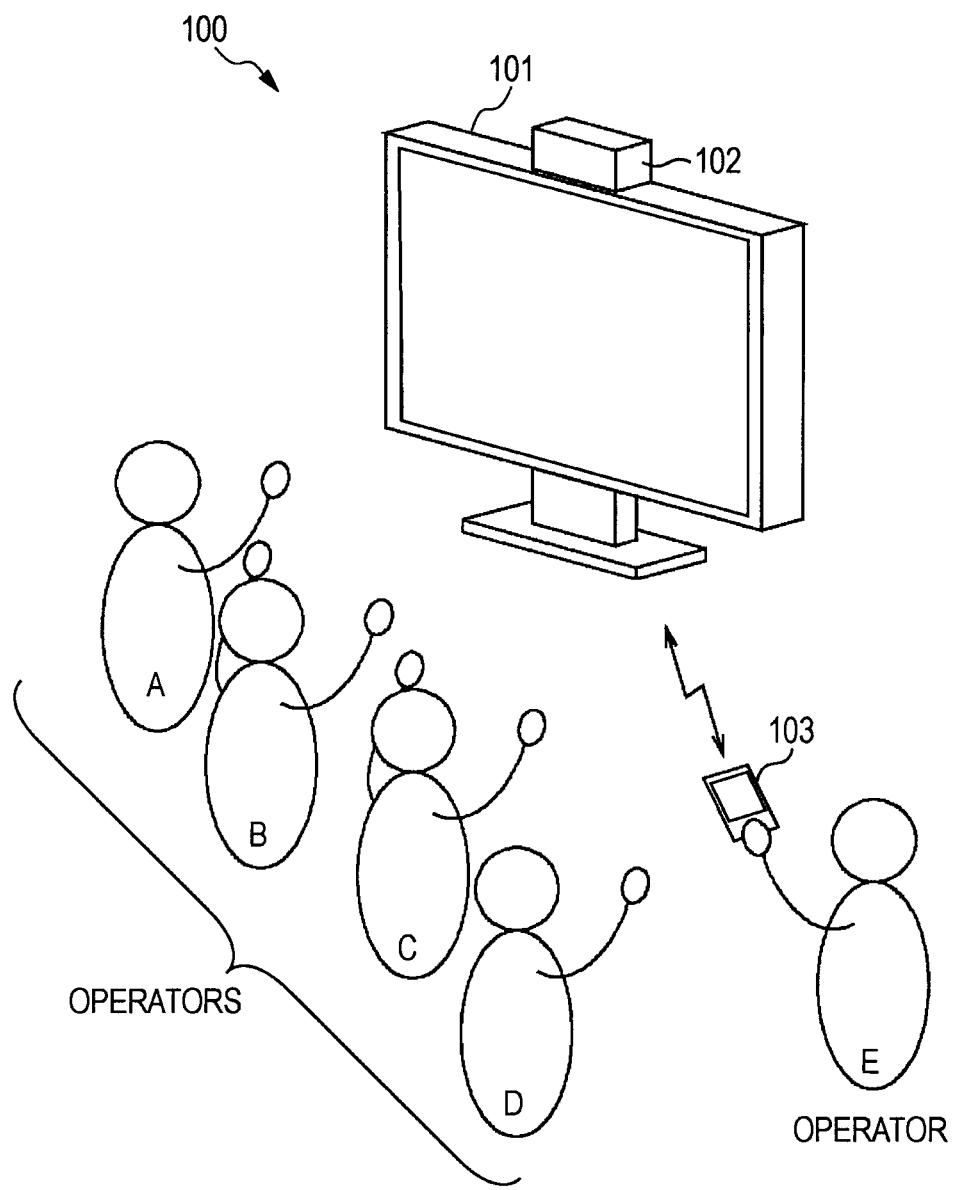
FIG. 2 is a schematic diagram showing the structure of a multiple-operator simultaneous-operation system, which is a specific example of the embodiment.

Next, specific examples of the embodiment will be described. In FIG. 2, 100 denotes a multiple-operator simultaneous-operation system, which is designed on the supposition that a plurality of operators perform operations simultaneously.

This multiple-operator simultaneous-operation system 100 includes a television (which may also be called a TV) 101 and a stereo camera 102 connected to this TV 101.

The stereo camera 102 is mounted on the top of the TV 101 to face in a direction extending from the front of the TV 101, and picks up images in front of the TV 101.

Here, there is a case in which, for example, there are four operators A to D within an image-pickup area of the stereo camera 102. Here, the TV 101 recognizes operations performed by the individual operators A to D in accordance with motion of the hands of the operators A to D detected from a camera image picked up by the stereo camera 102, and operates in accordance with these operations.

In this way, this multiple-operator simultaneous-operation system 100 is designed in such a manner that the individual operators A to D can simultaneously operate this TV 101 by moving their hands while the individual operators A to D are facing the TV 101.

Moreover, the TV 101 can perform wireless communication with a mobile terminal 103. The TV 101 recognizes, in accordance with a command sent from this mobile terminal 103, an operation performed by an operator E via the mobile terminal 103 and operates in accordance with this operation. Note that this mobile terminal 103 is a terminal having the function of remotely controlling the TV 101.

That is, this multiple-operator simultaneous-operation system 100 is designed to allow the operator E to operate the TV 101 via the mobile terminal 103 even from outside of the image-pickup area of the stereo camera 102, similarly to and simultaneously with the other operators A to D within the image-pickup area.

[1-2-2. Hardware Structure of TV and Stereo Camera]

Figure 3:
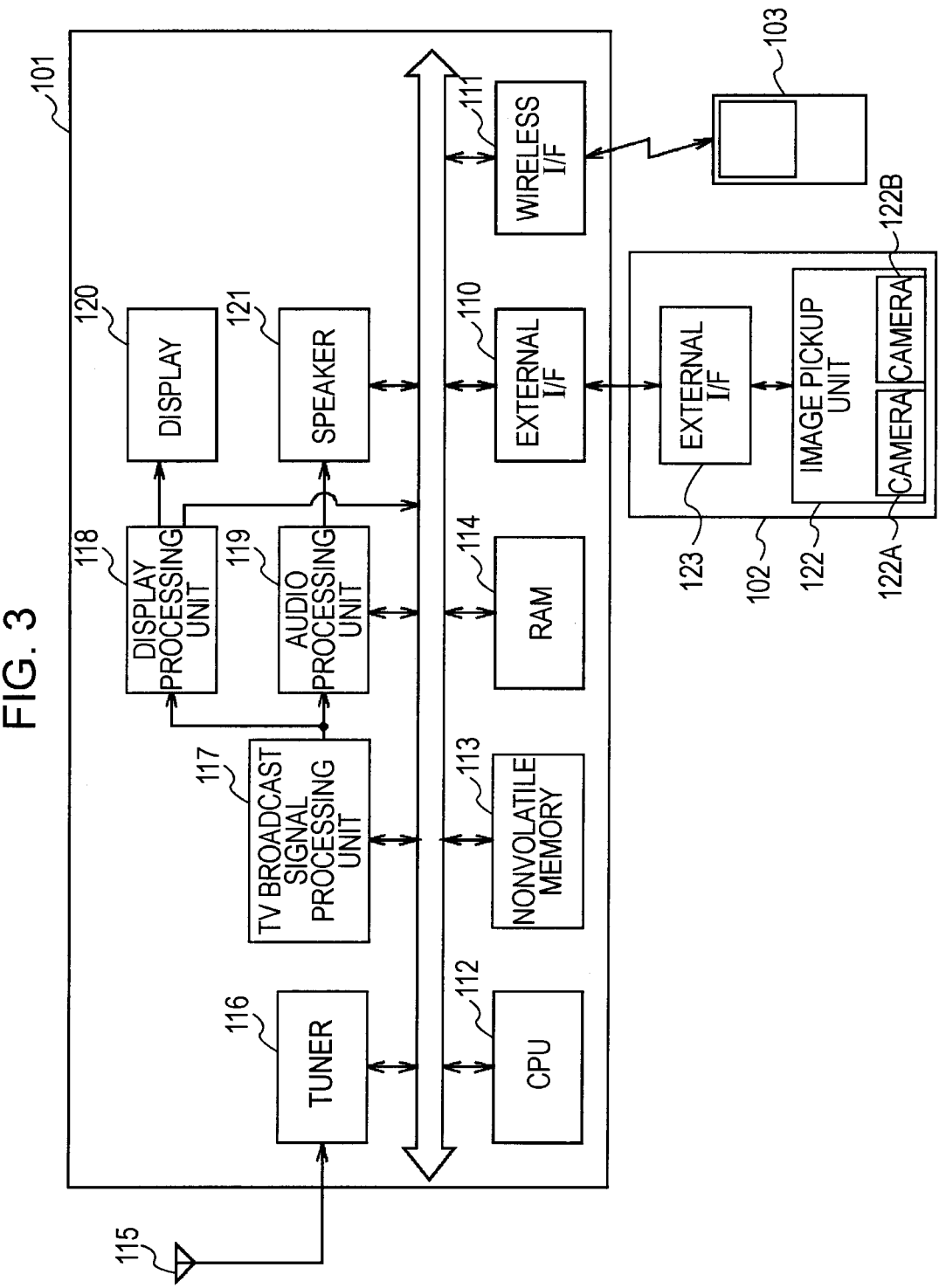
FIG. 3 is a block diagram showing a hardware structure of a TV and that of a stereo camera.

Next, a hardware structure of the TV 101 and that of the stereo camera 102 will be described using FIG. 3.

The TV 101 is cable connected to the stereo camera 102 via an external interface 110. Moreover, the TV 101 is wirelessly connected to the mobile terminal 103 via a wireless interface 111.

In this TV 101, a central processing unit (CPU) 112 is designed to perform central control over various units. The CPU 112 expands a program in a random access memory (RAM) 114, the program being stored in a nonvolatile memory 113, reads the program, and performs various processing and controls various units in accordance with this program.

As described above, this TV 101 is designed to detect motion of a hand of an operator and recognizes this motion as an operation. Specifically, the CPU 112 of the TV 101 controls the stereo camera 102 to pick up an image in front of the stereo camera 102 (that is, in front of the TV 101), and detects, for example, motion of the hands of the individual operators A to D from a camera image obtained as a result of image pickup. Then, the stereo camera 102 recognizes operations (such as a pointer operation or a gesture operation) performed by the individual operators A to D from the detected motion of their hands, and performs processing in accordance with these operations.

Moreover, the CPU 112 is also designed to recognize an operation performed by the operator E via the mobile terminal 103 in accordance with a command sent from the mobile terminal 103 and perform processing in accordance with this operation.

For information, a CPU is an abbreviation of a central processing unit, and a RAM is an abbreviation of a random access memory.

Moreover, this TV 101 has a television broadcast (which may also be called TV broadcast) output function. In actuality, when the TV 101 is instructed to output TV broadcast through an operation performed by an operator, the TV 101 inputs, to a tuner 116, a TV broadcast signal received by an external antenna 115. Under control performed by the CPU 112, the tuner 116 obtains a TV broadcast signal of the channel specified through the operation performed by the operator, and sends this TV broadcast signal to a TV broadcast signal processing unit 117.

Under control performed by the CPU 112, the TV broadcast signal processing unit 117 obtains video data and audio data of a program from this TV broadcast signal by performing predetermined processing on this TV broadcast signal. From among these data, the video data is sent from the TV broadcast signal processing unit 117 to a display processing unit 118, and the audio data is sent from the TV broadcast signal processing unit 117 to an audio processing unit 119.

Under control performed by the CPU 112, the display processing unit 118 obtains a video signal by performing predetermined display processing on the video data, and sends this video signal to a display 120. As a result, video of the program on air is displayed on the display 120.

On the other hand, under control performed by the CPU 112, the audio processing unit 119 obtains an audio signal by performing predetermined audio processing on the audio data, and sends this audio signal to a speaker 121. As a result, audio of the program on air is output from the speaker 121.

In this way, the TV 101 outputs TV broadcast and allows users to watch TV broadcast programs.

Furthermore, this TV 101 has a function of displaying a list of images. In actuality, the CPU 112 makes the nonvolatile memory 113 store image data received from, for example, the mobile terminal 103, which is wirelessly connected to the TV 101 via the wireless interface 111.

Then, when the CPU 112 is instructed to display a list of images through an operation performed by an operator, the CPU 112 reads a plurality of pieces of image data from the nonvolatile memory 113 and sends signals representing these pieces of image data to the display processing unit 118.

Under control performed by the CPU 112, the display processing unit 118 generates display data of an image list screen (which will be specifically described later) in accordance with the received pieces of image data. The display processing unit 118 obtains a screen signal by performing predetermined display processing on this display data, and sends this screen signal to the display 120. As a result, the image list screen is displayed on the display 120.

In this way, the TV 101 displays the image list screen and allows users to view a list of images. Note that this image list screen is a screen designed on the supposition that a plurality of operators perform operations simultaneously, and allows the individual operators to select arbitrary images.

On the other hand, the stereo camera 102 includes an image pickup unit 122 and an external interface 123. The stereo camera 102 is connected to the TV 101 via this external interface 123.

The image pickup unit 122 is provided with two cameras 122A and 122B, which are, for example, aligned horizontally.

The image pickup unit 122 is designed to stereoscopically pick up images of the space in front of the image pickup unit 122 by using these two cameras 122A and 122B.

In actuality, under control performed by the TV 101, the image pickup unit 122 picks up images in front of the image pickup unit 122 at predetermined time intervals by using each of the cameras 122A and 122B, and sequentially sends pieces of resulting camera image data to the TV 101 via the external interface 123.

Note that the pieces of the camera image data sent to the TV 101 include camera image data picked up by the camera 122A and camera image data picked up by the camera 122B.

The TV 101 recognizes, for example, the individual operators A to D who are in front of the TV 101 in accordance with the camera image data sent from the stereo camera 102.

Specifically, the CPU 112 of the TV 101 performs human detection processing on the camera image data picked up by, for example, the camera 122A, the camera image data being included in the camera image data sent from the stereo camera 102. The CPU 112 detects, for example, the face and hands of an operator by performing this human detection processing.

There are various algorithms for face detection. For example, there is an algorithm in which an area of skin color and feature values (portions assumed to be the eye and mouth) within this area of skin color are extracted from a camera image, and it is determined whether the area of skin color is the face in accordance with a position relationship between these feature values.

The CPU 112 detects areas, each of which is determined to be the face, (which may also be called face areas) from a camera image by utilizing such an algorithm, and obtains the coordinates of each of the detected face areas (for example, the center coordinates of the face area).

These coordinates are represented as the coordinates on the xy-plane in which, for example, the center of a camera image is set as the origin, the horizontal axis is set as the x axis, and the vertical axis is set as the y axis. That is, these coordinates are considered to be the coordinates on the xy-plane in which the center of an image-pickup area of the stereo camera 102 is set as the origin, the horizontal axis from the viewpoint of the stereo camera 102 is set as the x axis, and the vertical axis from the viewpoint of the stereo camera 102 is set as the y axis. This xy-plane is also a plane parallel to the display surface of the display 120.

On the other hand, there are also various algorithms for hand detection. For example, there is an algorithm in which an area of skin color and feature values (for example, an outline) within this area of skin color are extracted from a camera image, and it is determined whether the area of skin color is the hand by performing matching processing on these feature values and template images of the outline of the hand. Moreover, here, the shape of the hand can also be determined by, for example, preparing template images of different hand shapes and performing matching processing using each of the template images. For example, the shape of a clenched fist (which may also be called the rock shape) like the rock in paper-rock-scissors can be distinguished from the shape of an open palm (which may also be called the paper shape) like the paper in paper-rock-scissors.

The CPU 112 detects areas, each of which is determined to be the hand, (which may also be called hand areas) from a camera image by utilizing such an algorithm, and obtains the coordinates of each of the detected hand areas (for example, the center coordinates of the hand area).

Here, for example, if the four operators A to D are included in a camera image, the coordinates of each of the four faces and eight hands are obtained on the xy-plane by performing human detection processing. Thus, the CPU 112 can recognize the horizontal and vertical position relationships between the four faces and eight hands from the viewpoint of the stereo camera 102.

Furthermore, the CPU 112 calculates the distances from the stereo camera 102 to the four individual faces and eight individual hands by using a stereo method in accordance with the camera image data picked up by the camera 122A and the camera image data picked up by the camera 122B.

Here, when the position of the stereo camera 102 is set as the origin and the axis in the depth direction from the viewpoint of the stereo camera 102 is set as the z axis, each distance can be indicated by a point on the z axis.

In this way, the coordinates on the xy-plane and the points on the z axis of the four individual faces and eight individual hands are obtained, and thus the coordinates of the four individual faces and eight individual hands in the xyz-space are obtained.

Thus, the CPU 112 can recognize the position relationships between their four individual faces and eight individual hands from the viewpoint of the stereo camera 102 in the horizontal and vertical directions and the depth direction, that is, the position relationships in a three dimensional space.

Then, the CPU 112 determines the correspondence relationships between their faces and their hands in accordance with these position relationships in the three dimensional space. That is, the CPU 112 determines which of the faces and which of the hands belong to the same person (that is, an operator). Specifically, the CPU 112 determines that, for example, a face and the two nearest hands from the face in the three dimensional space belong to the same person.

As a result, for each of the four operators A to D, his/her face and hands (both hands) are correlated to each other. Thereafter, by detecting the faces and hands of the individual operators A to D from a camera image data sent from the stereo camera 102 at predetermined time intervals, the CPU 112 maintains the correspondence relationships between their faces and their hands and detects motion (a change in position and shape) of each of their hands.

Then, in accordance with the motion of the hands (both hands) of the individual operators A to D, the motion being detected as described above, the CPU 112 recognizes individual operations (such as a pointer operation and a gesture operation) performed by the individual operators A to D and performs processing in accordance with these operations.

[1-2-3. Image List Screen]

Next, an image list screen to be displayed on the display 120 of the TV 101 and operations to be performed by a plurality of operators on this image list screen will be specifically described. Note that, here, an example will be described in which five operators including the four operators A to D captured by the stereo camera 102 and the operator E having the mobile terminal 103 perform operations. Moreover, the CPU 112 performs display control over this image list screen 130 in accordance with a program read from the nonvolatile memory 113.

Figure 4:
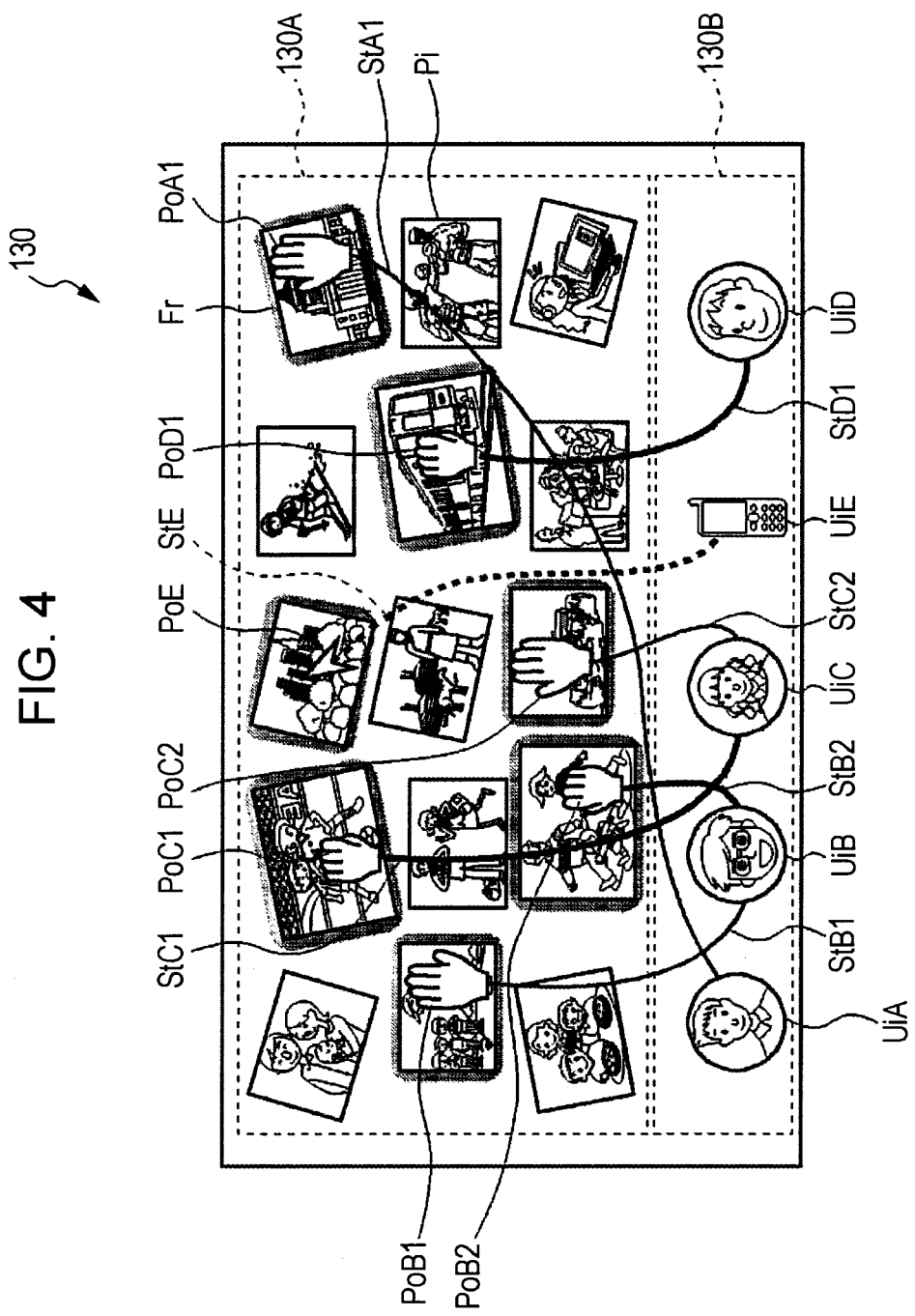
FIG. 4 is a schematic diagram showing the structure of an image list screen.

When the CPU 112 of the TV 101 is instructed to display a list of images through an operation performed by an operator, the CPU 112 makes the display 120 display the image list screen 130 as shown in FIG. 4.

This image list screen 130 is constituted by two regions: an area 130A, which is the upper two thirds of the image list screen 130 and an area 130B, which is the lower one third of the image list screen 130. Image icons Pi, each of which corresponds to one of a plurality of pieces of image data read from the nonvolatile memory 113, are aligned and displayed in the area 130A, which is the upper two thirds of the image list screen 130, from among the two areas. Hereinafter this area 130A may also be called an image display area 130A.

Moreover, operator icons Ui (UiA to UiE) corresponding to a plurality of individual operators (for example, the operators A to E), respectively, are laterally aligned and displayed in the area 130B, which is the lower one third of the image list screen 130. Hereinafter this area 130B may also be called an operator display area 130B.

Here, regarding the four operators A to D captured by the stereo camera 102, the face images of the individual operators A to D extracted from a camera image are displayed as the operator icons UiA to UiD in this operator display area 130B. On the other hand, about the operator E of the mobile terminal 103, the image of the mobile terminal 103 instead of his/her face image is displayed as the operator icon UiE. Operator icons UiA to UiD may also be generated based on predetermined image data stored in nonvolatile memory 113, RAM 114, and/or in an external storage device. The predetermined image data may correspond to a representation of a user's face and may not represent the actual face of the user.

Furthermore, a plurality of pointers Po (PoA1, PoB1, PoB2, PoC1, PoC2, PoD1, PoE1) operated by the individual operators A to E are displayed on this image list screen 130. Pointers Po may be generated based on predetermined image data stored in nonvolatile memory 113, RAM 114, and/or in an external storage device. The predetermined image data may correspond to a representation of a user's hand and may not represent the actual hand of the user.

Here, the operator icons UiA to UiD corresponding to the four individual operators A to D, respectively, captured by the stereo camera 102 are displayed at positions within the operator display area 130B, the positions corresponding to the positions of their individual faces located in the horizontal direction within the camera image.

Moreover, the pointers Po operated by these four individual operators A to D are designed to be displayed at positions within the image list screen 130, the positions corresponding to the positions of their hands (both hands) located in the vertical and horizontal directions within the camera image.

Specifically, the CPU 112 flips horizontally (performs mirroring on) a camera image picked up by the stereo camera 102 and converts the resolution of the camera image to that of the display 120.

Figure 5:
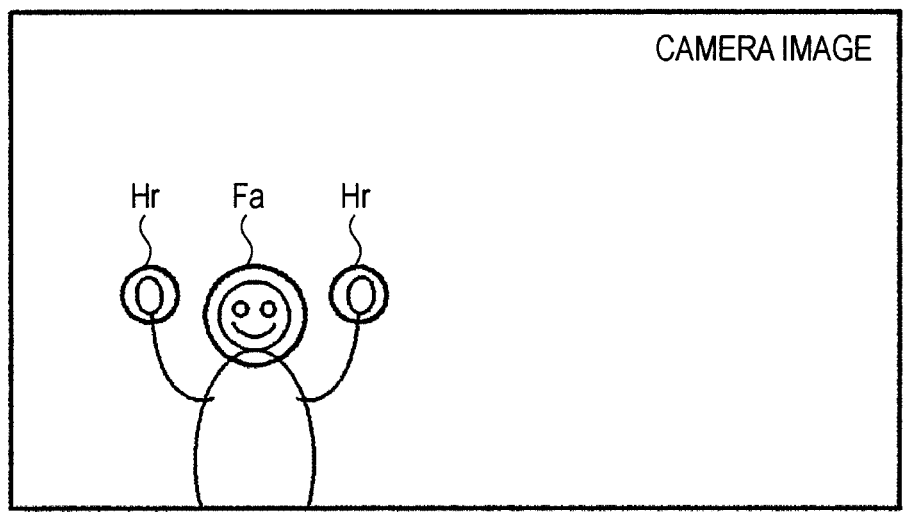
FIG. 5 is a schematic diagram used to explain detection of a face area and hand areas from a camera image on which mirroring has been performed.

Thereafter, the CPU 112 detects face areas Fa and hand areas Hr of the individual operators A to D from the camera image (FIG. 5), and obtains the coordinates of these areas within the camera image. These coordinates correspond to the coordinates within the screen of the display 120.

Figure 6:
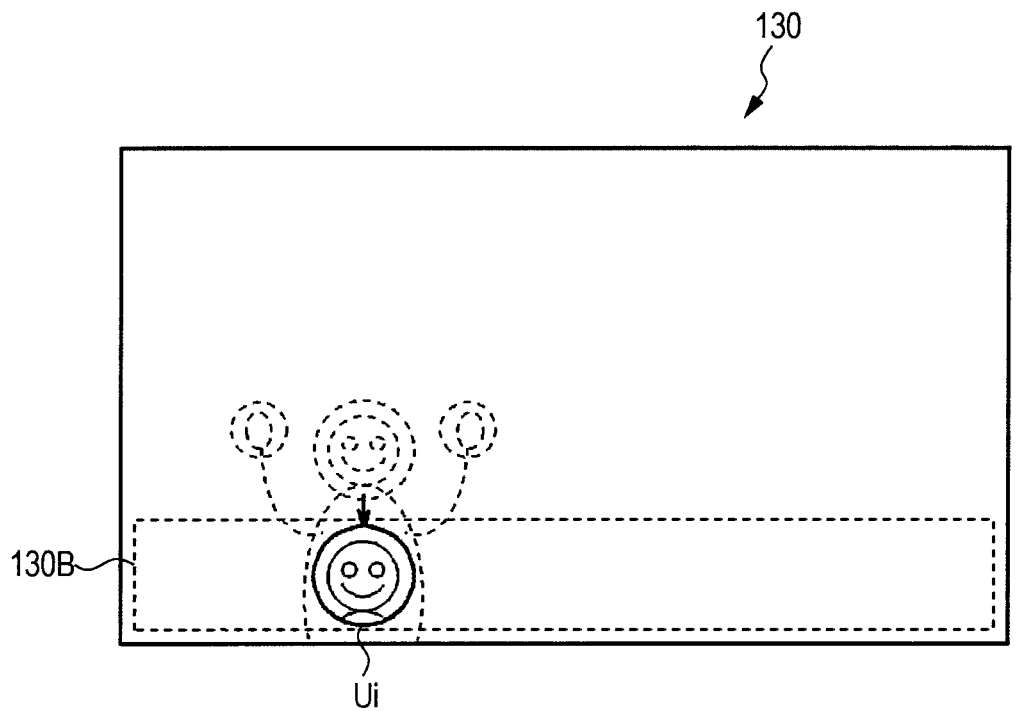
FIG. 6 is a schematic diagram showing a display example obtained when the image of a face area is displayed as an operator icon.

Furthermore, the CPU 112 fixes the y-coordinates of the face areas Fa of the individual operators A to D at the center of the operator display area 130B in the vertical direction, and makes the operator icons UiA to UiD be displayed at the positions corresponding to the x-coordinates of the face areas Fa of the individual operators A to D (FIG. 6). As a result, the operator icons UiA to UiD corresponding to the individual operators A to D, respectively, are displayed in the operator display area 130B at the positions corresponding to the positions of the faces of the individual operators A to D, respectively, within the camera image.

That is, the operator icons UiA, UiB, UiC, and UiD are aligned in order from the left and displayed in the operator display area 130B in such a manner that the positions of the operator icons UiA, UiB, UiC, and UiD correspond to the positions of the actual faces of the operators A to D, respectively, in front of the TV 101.

Figure 7:
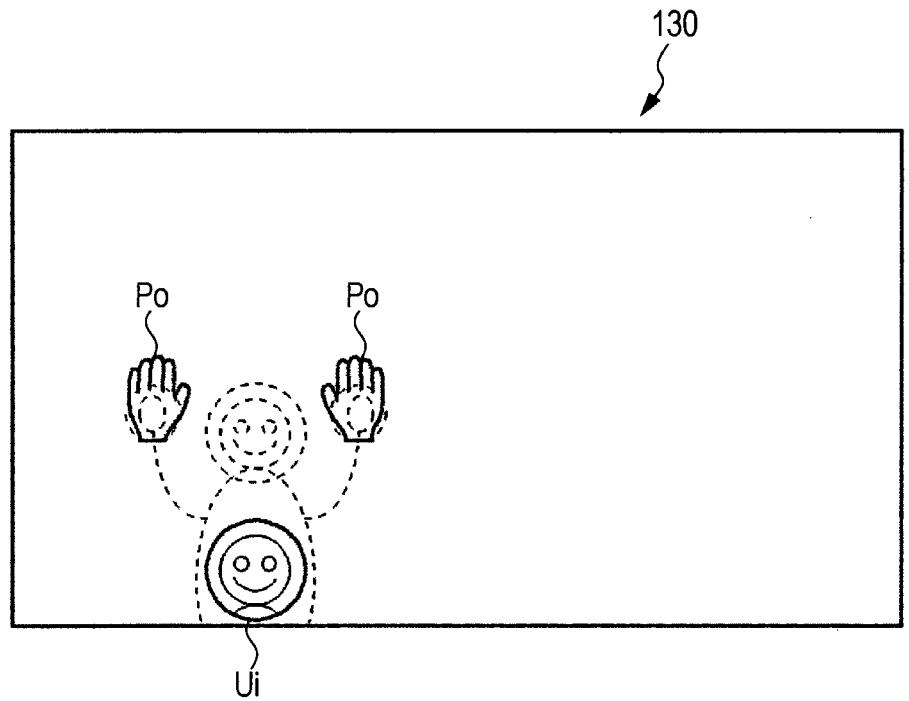
FIG. 7 is a schematic diagram showing a display example obtained when pointers are displayed at the positions of hands.

Moreover, the CPU 112 makes the pointers Po be displayed at the positions corresponding to the coordinates of the hand areas Hr of the individual operators A to D (FIG. 7). As a result, the pointers Po to be operated by the individual operators A to D are displayed on the image list screen 130 at the positions corresponding to the positions of the hands of the individual operators A to D within the camera image.

That is, for example, the pointer PoB1 is displayed at a position, on the image list screen 130, corresponding to the actual position of the left hand of the operator B who is in front of the TV 101. The pointer PoB2 is displayed at a position, on the image list screen 130, corresponding to the actual position of his/her right hand.

Furthermore, the CPU 112 detects changes in the positions of the hands of the individual operators A to D from a camera image, and makes the pointers Po move in accordance with the changes in the positions of their detected hands.

In this way, the image list screen 130 is designed in such a manner that the pointers Po corresponding to the hands of the individual operators A to D can be moved onto, for example, desired image icons Pi by moving their hands.

Moreover, the CPU 112 is designed to graphically show that an image icon Pi is in a state of being specified by a pointer Po by displaying a frame Fr at the periphery of this image icon Pi when the pointer Po is located on the image icon Pi (FIG. 4).

Furthermore, when the pointer Po is in the state of being located on the image icon Pi, if the CPU 112 detects that the shape of his/her hand corresponding to this pointer Po changes from the paper shape into the rock shape, the CPU 112 makes the image icon Pi be in the state of being selected by this pointer Po.

Here, the CPU 112 is designed to graphically show that this image icon Pi is in the state of being selected, by making this image icon Pi be displayed larger than other image icons Pi (FIG. 4).

In this way, the image list screen 130 is designed in such a manner that the individual operators A to D can select desired image icons Pi by operating the pointers Po.

Moreover, if the position of his/her hand corresponding to a pointer Po moves while an image icon Pi is in the state of being selected by this pointer Po, the CPU 112 makes this image icon Pi move together with the pointer Po.

Furthermore, when the image icon Pi is in the state of being selected by the pointer Po, if the shape of his/her hand corresponding to the pointer Po changes from the rock shape into the paper shape, the CPU 112 makes this image icon Pi be in the state of being released.

In this way, the image list screen 130 is also designed in such a manner that the individual operators A to D can drag and drop desired image icons Pi by operating pointers Po.

Furthermore, the CPU 112 makes the shapes of the pointers Po change in accordance with changes in the shapes of the hands of the individual operators A to D. That is, when the shape of his/her hand is the rock shape, the CPU 112 makes the shape of the pointer Po corresponding to this hand change into the rock shape. On the other hand, when the shape of his/her hand is the paper shape, the CPU 112 makes the shape of the pointer Po corresponding to this hand change into the paper shape.

In this way, the CPU 112 is designed to graphically show hand gestures performed by the individual operators A to D by the shapes of the pointers Po.

Furthermore, association information, or strings St, connecting the operator icons UiA to UiD corresponding to the faces of the individual operators A to D, respectively, and the pointers Po corresponding to the hands of the individual operators A to D are displayed on the image list screen 130 in accordance with the correspondence relationships between the faces and the hands of the operators A to D.

Figure 8:
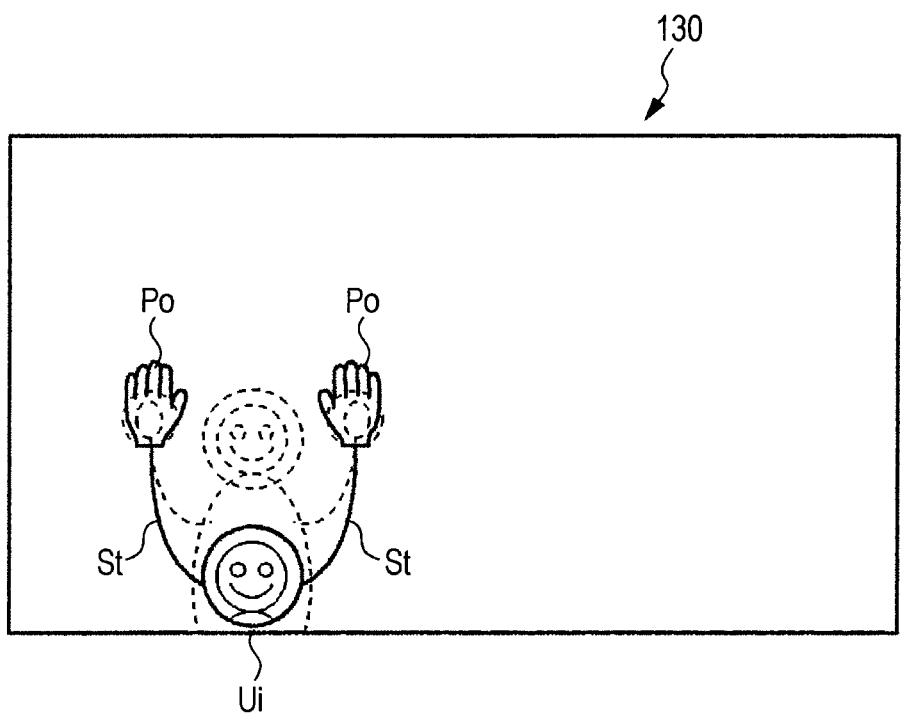
FIG. 8 is a schematic diagram showing a display example obtained when strings are displayed.

Specifically, as described above, the CPU 112 determines the correspondence relationships between the faces and the hands of the individual operators A to D from the camera image. Then, the CPU 112 makes strings St connecting an operator icon Ui and pointers Po be displayed on the image list screen 130 in accordance with these correspondence relationships (FIG. 8). Here, the CPU 112 calculates a curve connecting a display position, or the coordinates, of the operator icon Ui (for example, the center coordinates) and a display position, or the coordinates, of the pointer Po (for example, the center coordinates), and makes the curve be displayed as a string St.

Note that the CPU 112 is designed to connect an operator icon Ui and a pointer Po via a string St on every occasion, even when the pointer Po is moved, by recalculating the curve of the string St every time the coordinates of the operator icon Ui or the coordinates of the pointer Po change.

As a result, for example, as shown in FIG. 4, a string StB1 connecting the operator icon UiB corresponding to the face of the operator B and the pointer PoB1 corresponding to the left hand of the operator B is displayed on the image list screen 130. Moreover, a string StB2 connecting this operator icon UiB and the pointer PoB2 corresponding to the right hand of the operator B is displayed.

Therefore, this image list screen 130 can make people who view this image list screen 130 (for example, the operators A to E) easily recognize which of the individual pointers Po are operated by which of the operators A to D.

Moreover, the CPU 112 is also designed to change the shape of the string St in accordance with whether the shape of the pointer Po is the paper shape or the rock shape.

Figure 9A:
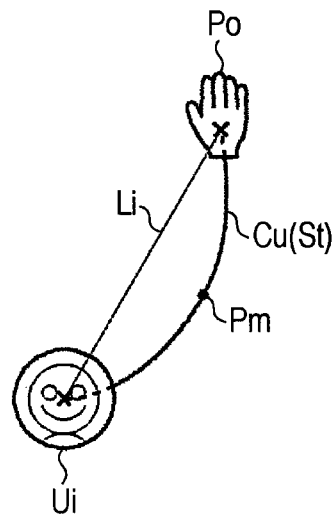
FIGS. 9A and 9B are schematic diagrams used to explain a change in the shape of string.
Figure 9B:
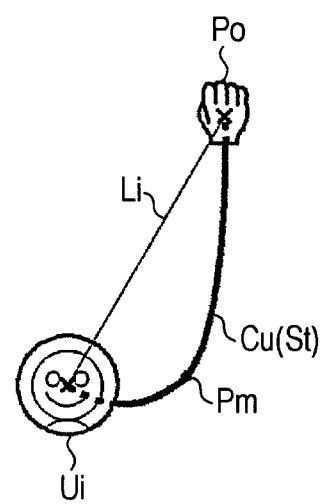

Specifically, as shown in FIG. 9, the CPU 112 calculates a curve Cu, which is curved compared with a straight line Li which is actually not displayed) connecting the center coordinates of the operator icon Ui and the center coordinates of the pointer Po. Here, when the shape of the pointer Po is the paper shape, as shown in FIG. 9A, the CPU 112 calculates a curve Cu having a vertex Pm that has the farthest distance to the line Li and that is positioned in the middle of the curve Cu, and makes this curve Cu be displayed as the string St.

In contrast, compared with the case when the pointer Po is the paper shape, when the pointer Po is the rock shape, the CPU 112 calculates a curve Cu having a vertex Pm that is positioned closer to the operator icon Ui and that has a greater distance to the line Li. Furthermore, compared with the case when the pointer Po is the paper shape, the CPU 112 makes this curve Cu thicker and be displayed as the string St.

That is, the string St is likened to an arm of an operator on this image list screen 130. This image list screen 130 is designed to graphically give an impression that the operator gives the pointer Po a good pull by bending his/her arm by making the string St become curved and thicker when the shape of the pointer Po becomes the rock shape.

Therefore, the operator can select an image icon Pi on this image list screen 130 by using the pointer Po in much the same way the operator grabs the image by his/her own hand.

Furthermore, if a plurality of pointers Po are continuously displayed on this image list screen 130, the screen may look untidy. Thus, it is designed to make pointers Po having no movement over a predetermined time be not temporarily displayed on the image list screen 130.

Specifically, for each of the hands of the operators A to D, if his/her hand stops moving and thus a corresponding one of the pointers Po stops moving, the CPU 112 starts to count.

Then, the CPU 112 makes the pointer Po be not displayed if a predetermined time has passed since the pointer Po stopped moving.

Figure 10A:
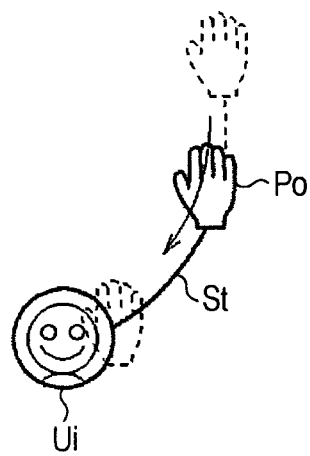
FIGS. 10A and 10B are schematic diagrams showing an animation of the pointer.

Here, the CPU 112 does not simply make the pointer Po having no movement be not displayed. As shown in FIG. 10A, the CPU 112 first makes an animation be displayed in which this pointer Po is being drawn into the operator icon Ui to which the pointer Po is connected via the string St, and then makes the pointer Po be not displayed.

Figure 10B:
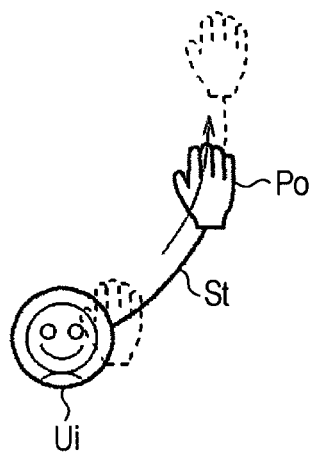

Thereafter, it is assumed that his/her hand corresponding to this pointer Po moves again. Then, the CPU 112 does not simply make this pointer Po be displayed again. As shown in FIG. 10B, the CPU 112 first makes the pointer Po be displayed near the operator icon Ui, and then makes an animation be displayed in which the pointer Po is being moved to the location corresponding to the actual location of his/her hand.

Note that the CPU 112 similarly makes an animation be displayed not only when the CPU 112 makes the pointer Po be displayed again but also, for example, when the CPU 112 makes a pointer Po be displayed on the screen for the first time. In this case, for example, the CPU 112 makes each pointer Po be not displayed until the CPU 112 detects movement of his/her hand corresponding to the pointer Po. When the CPU 112 detects the movement of his/her hand corresponding to the pointer Po, the CPU 112 makes the pointer Po be displayed and then makes the animation be displayed.

Therefore, this image list screen 130 can make people who view this image list screen 130 (for example, the operators A to E) easily recognize which of the pointers Po are operated by which of the operators. Moreover, a situation can be prevented in which a plurality of pointers Po are continuously displayed on the screen even though they are not being operated.

On the other hand, the operator icon UiE corresponding to the mobile terminal 103 is displayed in, for example, an open area within the operator display area 130B. Furthermore, the pointer Po operated via this mobile terminal 103 is designed to be moved in accordance with a command sent from the mobile terminal 103.

Note that, here, the mobile terminal 103 is a terminal having an operation unit, which is designed on the supposition that it is operated with one hand. Thus, this mobile terminal 103 can operate one pointer Po at a time. Thus, just one pointer PoE is displayed on the image list screen 130 as the pointer Po which can be operated via the mobile terminal 103. The shape of this pointer PoE is fixed to an arrow shape.

Then, the image list screen 130 is designed in such a manner that, similarly to the individual operators A to D, the operator E can drag and drop a desired image icon Pi by operating the pointer PoE via the mobile terminal 103.

Furthermore, this image list screen 130 is also designed in such a manner that a string St connecting the operator icon UiE and the pointer PoE is displayed. Here, the CPU 112 makes a string StE connecting the operator icon UiE and the pointer PoE be displayed in accordance with a correspondence relationship between a command and the mobile terminal 103 that has sent the command. Note that the string StE is displayed in such a manner that this string StE is indicated by, for example, a form (for example, a dotted line) different from the strings St connecting the operator icons Ui of the operators A to D captured by the stereo camera 102 and the pointers Po.

Furthermore, when this pointer PoE is not being moved over a predetermined time, this pointer PoE is also designed to be not displayed after an animation regarding the pointer PoE is displayed. When the pointer PoE is being moved again, this pointer PoE is also designed to be displayed again after an animation regarding the pointer PoE is displayed.

For information, a specific example of hardware including the recognition unit 2, the control unit 3, and the detection unit 4 of the information processing apparatus 1 described in the overview of the embodiment is the above-described CPU 112 of the TV 101. Moreover, specific examples of an operation body described in the overview of the embodiment are the above-described operators A to D and the mobile terminal 103. Furthermore, a specific example of the first display information indicating the operation body described in the overview is the above-described operator icon Ui. Furthermore, a specific example of the second display information operated in accordance with an instruction from the operation body described in the overview is the above-described pointer Po. Furthermore, a specific example of the relativity information showing the relativity between the first display information and the second display information is the above-described string St.

[1-2-4. Pointer Display Processing Procedure]

Here, a procedure of processing regarding display of a pointer Po (which may also be called a pointer display processing procedure) will be described. For information, this pointer display processing procedure is a procedure of pointer display processing executed by the CPU 112 of the TV 101 in accordance with a program read from the nonvolatile memory 113. The CPU 112 is designed to execute this pointer display processing with respect to each pointer Po. Thus, here, description will be made regarding the pointer display processing to be executed with respect to one certain pointer Po.

Figure 11:
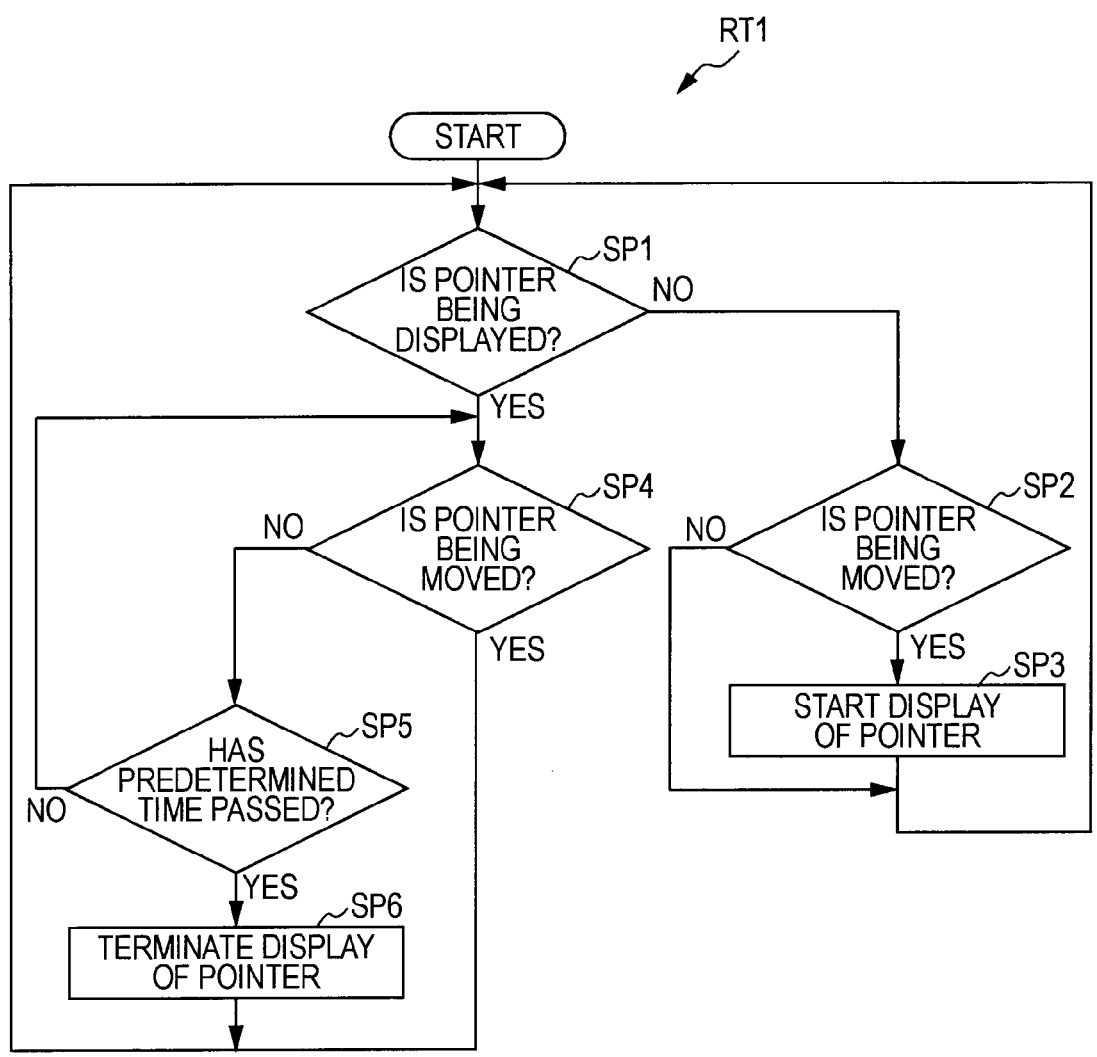
FIG. 11 is a flowchart of a pointer display processing procedure.

When the CPU 112 is instructed to, for example, display a list of images through an operator's operation, the CPU 112 makes the image list screen 130 be displayed and also starts a pointer display processing procedure RT1 shown in FIG. 11, and proceeds to step SP1.

In step SP1, the CPU 112 determines whether a pointer Po is currently being displayed. Here, if a negative determination is obtained because the pointer Po is not currently being displayed, the CPU 112 proceeds to step SP2.

In step SP2, the CPU 112 determines whether this pointer Po is being moved. Here, if a positive determination is obtained, this means that the pointer Po is moved because the hand corresponding to this pointer Po is made to be moved or a command is sent from the mobile terminal 103.

Here, the CPU 112 proceeds to step SP3. In step SP3, the CPU 112 starts display of this pointer Po. Here, the CPU 112 makes an animation be displayed in which this pointer Po is drawn from an operator icon Ui and also makes a string St connecting this pointer Po and the operator icon Ui be displayed.

After the pointer Po is displayed in this way, the CPU 112 returns to step SP1.

In contrast, if a negative determination is obtained in the above-described step SP2, this means that the pointer Po is not being moved. Here, the CPU 112 skips processing in step SP3 and returns to step SP1.

On the other hand, if a positive determination is obtained in the above-described step SP1, this means that the pointer Po is currently being displayed. Here, the CPU 112 proceeds to step SP4.

In step SP4, the CPU 112 determines whether this pointer Po is being moved. Here, if a negative determination is obtained because this pointer Po is not being moved, the CPU 112 proceeds to step SP5.

In step SP5, the CPU 112 determines whether a predetermined time has passed since motion of this pointer Po was stopped. Here, if a negative determination is obtained because a predetermined time has not yet passed, the CPU 112 returns to step SP4.

In contrast, if a positive determination is obtained in this step SP5 because a predetermined time has passed since motion of the pointer Po was stopped, the CPU 112 proceeds to step SP6. In step SP6, the CPU 112 terminates display of this pointer Po (that is, makes the pointer Po be not displayed), and returns to step SP1. Here, the CPU 112 makes an animation be displayed in which this pointer Po is drawn into the operator icon Ui).

Moreover, if a positive determination is obtained in the above-described step SP4 because the pointer Po is being moved, the CPU 112 skips processing in steps SP5 and SP6, and returns to step SP1.

The CPU 112 is designed to control display and non-display of the pointer Po in accordance with such a pointer display processing procedure RT1.

[1-2-5. Operation and Effects]

With the above-described structure, the CPU 112 of the TV 101 detects the faces and hands of the individual operators A to D who are in front of the TV 101 from a camera image picked up by the stereo camera 102. Furthermore, the CPU 112 determines which of their faces and which of their hands belong to the same person in accordance with the position relationships between the faces and hands of the individual operators A to D. That is, the CPU 112 determines the correspondence relationships between their faces and their hands.

Then, the CPU 112 makes the operator icons UiA to UiD corresponding to the faces of the individual operators A to D, respectively, and a plurality of pointers PoA to PoD that are moved in accordance with motion of the hands of the individual operators A to D, respectively, be displayed on the image list screen 130.

Furthermore, here, the CPU 112 makes the strings St connecting the operator icons UiA to UiD corresponding to the faces of the individual operators A to D and the pointers Po corresponding to the hands of the individual operators A to D be displayed on the image list screen 130 in accordance with the determined correspondence relationships between their faces and their hands.

Therefore, the TV 101 can make people (operators) who view the image list screen 130 easily recognize the relativity between the pointers Po and the operator icons Ui, that is, which of the pointers Po are operated by which of the operators.

Moreover, when the mobile terminal 103 is connected to the TV 101, the CPU 112 makes the operator icon UiE corresponding to the mobile terminal 103 be displayed on the image list screen 130. Moreover, here, the CPU 112 makes the pointer PoE, which is moved in accordance with a command sent from this mobile terminal 103, be displayed on the image list screen 130.

Furthermore, the CPU 112 makes the string St connecting the operator icon UiE corresponding to the mobile terminal 103 and the pointer PoE operated via the mobile terminal 103 be displayed in accordance with the correspondence relationship between the command and the mobile terminal 103, which sent this command.

Therefore, the TV 101 can make people (operators) who view the image list screen 130 easily recognize that the pointer PoE is operated via the mobile terminal 103.

Moreover, by displaying the strings St connecting the operator icons Ui and the pointers Po in this way, the TV 101 can make people who view the image list screen 130 perceive motion of a pointer Po as the entire motion of the pointer Po and the string St. Thus, the image list screen 130 can make motion of the pointer Po be easily recognized even when, for example, the motion of the pointer Po is slow.

With the above-described structure, the TV 101 can make operators easily recognize the relativity between the pointers Po and the operator icons Ui, that is, which of the pointers Po are operated by which of the operators. Thus, even when there are a plurality of operators and a plurality of pointers Po are displayed, operators can be made to easily recognize which of the pointers Po are operated by which of the operators. Therefore, preferable operability can be obtained regardless of the number of operators performing operations simultaneously.

2. Other Embodiments 2-1. Another Embodiment 1

Note that, in an above-described specific example of the embodiment, the operators A to E near the TV 101 operate the TV 101 while directly looking at the display 120, but not limited thereto. Operators at remote sites may operate the TV 101 via a network.

In this case, for example, two sets of the TV 101 and the stereo camera 102 are prepared. Then, the two TVs 101 are connected to each other via the network. Note that, in this case, each of the two TVs 101 has a network interface.

Furthermore, for example, one of the two TVs 101 is treated as a host and the other one is treated as a client. An operator is allowed to perform an operation on the TV 101, which is the host, directly or via the TV 101, which is the client. Here, the TV 101, which is the host, may also be called a host appliance 101, and the TV 101, which is the client, may also be called a client appliance 101.

Figure 12:
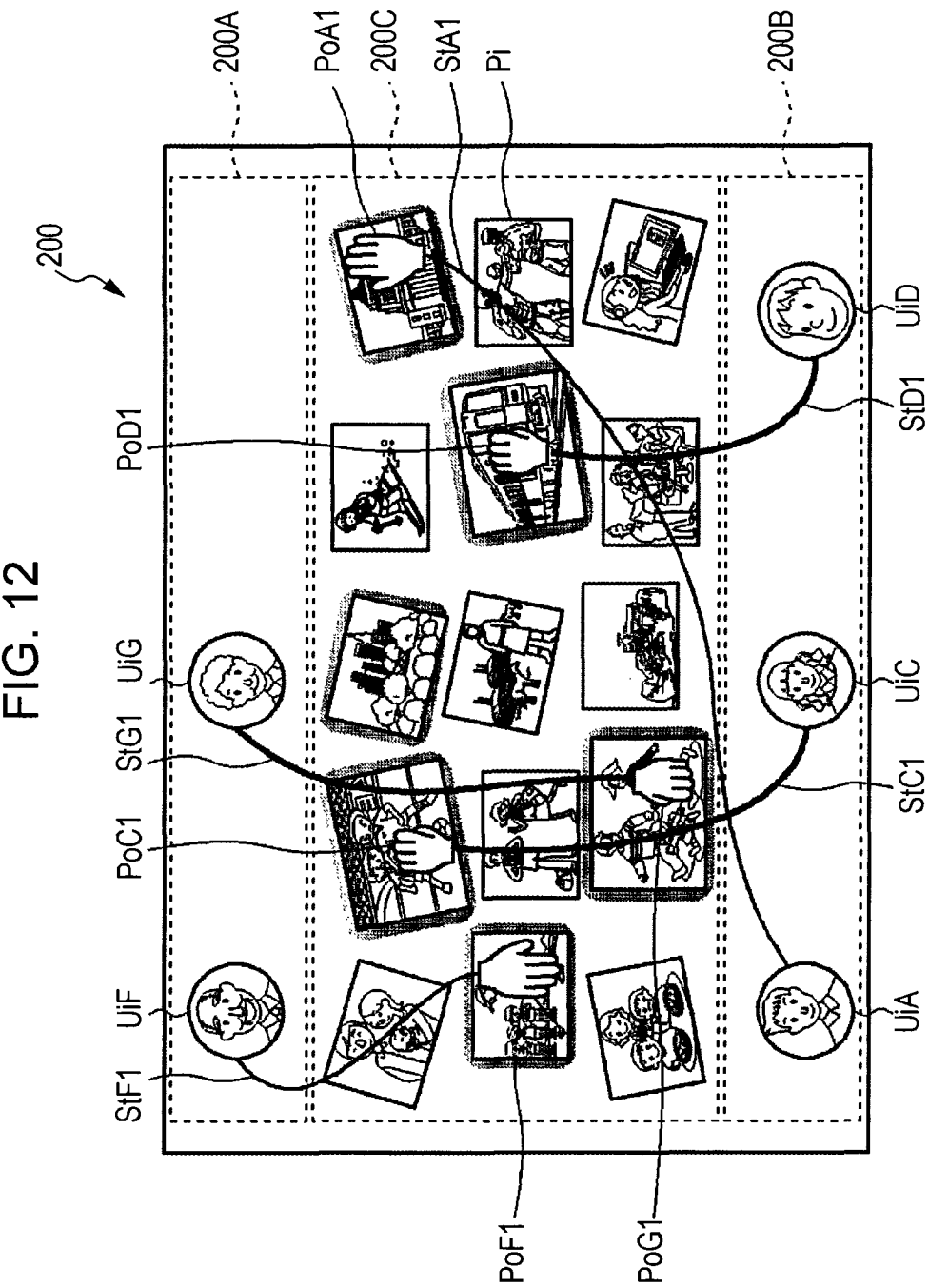
FIG. 12 is a schematic diagram showing the structure of an image list screen according to another embodiment.

Here, the CPU 112 of the host appliance 101 makes the display 120 display, for example, an image list screen 200 shown in FIG. 12.

The image list screen 200 is constituted by three regions: an area 200A, which is the upper one fourth of the image list screen 200; an area 200B, which is the lower one fourth of the image list screen 200; and an area 200C, which is an area between the areas 200A and 200B. Image icons Pi corresponding to a plurality of pieces of image data read from the nonvolatile memory 113 of the host appliance 101 are aligned and displayed in the area 200C from among the three areas. That is, this area 200C is an image display area 2000.

Moreover, the operator icons UiA, UiC, and UiD corresponding to the individual operators A, C, and D, respectively, captured by the stereo camera 102 at the host side are aligned laterally and displayed in the area 200B, which is the lower one fourth of the image list screen 200. This area 200B is also called an operator display area 200B.

Furthermore, operator icons UiF and UiG corresponding to individual operators F and G, respectively, captured by the stereo camera 102 at the host side are aligned laterally and displayed in the area 200A, which is the upper one fourth of the image list screen 200. This area 200A is also called a communications-partner display area 200A.

Note that the CPU 112 of the host appliance 101 obtains, from the client appliance 101, a camera image picked up by the stereo camera 102 at the client side, detects the faces of the operators F and G from this camera image, and makes the operator icons UiF and UiG be displayed.

Furthermore, pointers Po are displayed at positions corresponding to the hands of the individual operators A, C, and D at the host side on the image list screen 200, the hands of the individual operators A, C, and D being detected from the camera image at the host side. Moreover, pointers Po are displayed at positions corresponding to the hands of the individual operators F and G detected from the camera image at the client side.

Furthermore, the strings St connecting the operator icons Ui and the pointers Po are displayed on the image list screen 200 in accordance with the correspondence relationships between the faces and the hands of the individual operators A, C, D, F, and G determined in accordance with the camera image at the host side and the camera image at the client side.

Then, the CPU 112 detects changes in the positions of the hands of the operators A, C, D, F, and G in accordance with the camera image at the host side and the camera image at the client side, and makes the pointers Po move in accordance with these changes.

Moreover, the CPU 112 makes the display 120 of the client appliance 101 also display this image list screen 200 by sending screen data of this image list screen 200 to the client appliance 101 via the network interface.

Therefore, the operators F and G at the client side can operate the pointers Po on the image list screen 200 via the network similarly to and simultaneously with the operators A, C, and D at the host side.

For information, the operator icons Ui at the host side may be displayed in the communications-partner display area 200A and the operator icons Ui at the client side may also be displayed in the operator display area 200B on the image list screen 200 that the client appliance 101 is made to display.

Moreover, the client appliance 101 does not have to include the structure of the TV 101 on every occasion, but have to include at least the display 120, the external interface 110, and the network interface.

2-2. Another Embodiment 2

In a specific example, which is described above, of the embodiment, the stereo camera 102 is connected to the TV 101 from the outside, but not limited thereto. The stereo camera 102 may also be built in the TV 101.

Moreover, an infrared camera or a normal monocular camera may also be connected to or built in the TV 101, instead of the stereo camera 102. For information, in a case of a monocular camera, the accuracy in determining the correspondence relationships between their faces and their hands decreases because information regarding the depth direction is lost; however, the structure can be simpler than that of a stereo camera. Moreover, the position of the stereo camera 102 is not limited to the top of the display 120, and may also be attached at the bottom thereof.

Moreover, a plurality of controllers, in stead of the stereo camera 102, may be connected to the TV 101, and a plurality of individual operators may also simultaneously operate the TV 101 via the controllers.

In this case, the CPU 112 of the TV 101 make a plurality of pointers Po, which are operated in accordance with input signals from the individual controllers, and the operator icons Ui corresponding to the individual controllers be displayed on the image list screen 130. Furthermore, the CPU 112 makes the strings St connecting the operator icons Ui and the pointers Po be displayed in accordance with the correspondence relationships between the input signals from the controllers and the controllers that input these input signals.

2-3. Another Embodiment 3

In another specific example, which is described above, of the embodiment, an example has been described in which an embodiment of the present invention has been applied to the image list screen 130, but the example is not limited thereto. An embodiment of the present invention may be and can be applied to various other screens as long as pointers can be operated on the screens.

For example, an embodiment of the present invention may be applied to a game screen in which a plurality of individual operators operate pointers to move characters.

Moreover, each of the operator icons Ui as the first display information, the pointers Po as the second display information, and the strings St as the relativity information may also be replaced with various other information if its functional role does not change. For example, the pointers Po may also be replaced with cursors.

2-4. Another Embodiment 4

In another specific example, which is described above, of the embodiment, the strings St are indicated by a curved line. However, if it can be shown that the pointers Po are connected to the operator icons Ui, that is, the relativity between the pointers Po and the operator icons Ui can be shown, the strings St may be indicated by a straight line.

Moreover, for example, the strings St may also be indicated by a dotted line, or the strings St may also be indicated by a string of figures (such as circles or triangles).

In another specific example, which is described above, of the embodiment, the display color of the strings St is not stated. However, the display color may also be changed from a combination of an operator icon Ui, his/her pointers Po, and his/her strings St to another.

Therefore, operators can recognize the relativity between the pointers Po and the operator icons Ui also from display colors.

Moreover, here, the display color of the frame Fr displayed at the periphery of the image icon Pi specified by the pointer Po may also be the same as the display color of this pointer Po. By doing this, which operator is specifying the image icon Pi by using the pointer Po can be easily recognized.

In another specific example, which is described above, of the embodiment, when display of the pointer Po is terminated, the animation in which the pointer Po is being drawn into the image icon Pi is displayed. When display of the pointer Po is started, the animation in which the pointer Po is jumping out from the image icon Pi is displayed.

Here, for example, when the animation in which the pointer Po is jumping out from the image icon Pi is displayed, the pointer Po, the string St, and the operator icon Ui may also be highlighted in such a manner that they flash on and off or these are displayed in an enlarged manner. Moreover, when the animation in which the pointer Po is being drawn into the image icon Pi is displayed, these may also be highlighted similarly.

Furthermore, the display manner of the pointer Po, the string St, and the operator icon Ui may also differ from when the pointer Po is the rock shape to when the pointer Po is the paper shape. For example, when the pointer Po is the rock shape, these may also be displayed in such a manner that these flash on and off. When the pointer Po is the paper shape, these may also be displayed normally.

In another specific example, which is described above, of the embodiment, the display manner of the pointer PoE operated by the mobile terminal 103 is made to be different from the display manner of other pointers Po by fixing the shape of the pointer PoE to an arrow shape, but not limited thereto. The pointer PoE may also have the same display manner as other pointers Po.

Moreover, the display manner of the string StE connecting this pointer PoE and the operator icon UiE corresponding to the mobile terminal 103 is made to be different from the display manner of the other strings St by indicating the string StE by a dotted line, but not limited thereto. The string StE may also have the same display manner as the other strings St.

2-5. Another Embodiment 5

In another specific example, which is described above, of the embodiment, the image icons Pi can be dragged and dropped on the image list screen 130 by operating the pointers Po. Here, a trash-box icon may be made to be displayed on the image list screen 130. If an image icon Pi is dragged and dropped onto this trash-box icon, image data corresponding to this image icon Pi may also be deleted from the nonvolatile memory 113.

Moreover, for example, if the image icon Pi is dragged and dropped onto the operator icon UiE corresponding to the mobile terminal 103, image data corresponding to the image icon Pi may also be transferred to the mobile terminal 103.

2-6. Another Embodiment 6

In another specific example, which is described above, of the embodiment, display of the pointer Po which has not been moved over a predetermined time is terminated (that is, not displayed), but not limited thereto. Regardless of whether the pointer Po is being moved, the pointer Po may also be displayed continuously.

Moreover, in the specific example, which is described above, of the embodiment, when a pointer Po is not displayed, if motion regarding the pointer Po is detected, display of the pointer Po is started. Here, the camera image on which mirroring has been performed and whose resolution has been converted to that of the display 120 may also be displayed on the display 120 for a given period of time.

In this case, for example, the image list screen 130 may also be displayed in a translucent manner for a given period of time and then the camera image may also be made to be displayed as the background of the image list screen 130. Or, display may also be switched from the image list screen 130 to the camera image for a given period of time.

When display of the pointer Po is started in this way, if the display 120 is made to display the camera image picked up at the time, operators can be made to easily recognize that display of the pointer Po is started in accordance with motion of which hand of which operator.

Moreover, by displaying the camera image in this way, operators can be made to recognize the image-pickup area of the stereo camera 102, that is, an area where the TV 101 can detect motion of the hands of operators.

Furthermore, when a new person is detected from a camera image, the camera image may also be displayed.

For information, a person or the like just passing by in front of the stereo camera 102 may be detected from a camera image. Thus, for example, when a person detected from a camera image stays within the camera image over a predetermined time, this person may also be recognized as an operator.

Furthermore, for example, in order to reject an unintentional hand gesture performed by an operator, for example, the pointer Po corresponding to this hand may also be displayed after a given period of time has passed since motion of his/her hand was detected.

2-7. Another Embodiment 7

In another specific example, which is described above, of the embodiment, the upper two thirds of the image list screen 130 is set as the image display area 130A and the lower one third of the image list screen 130 is set as the operator display area 130B, and the operator icons Ui are made to be displayed in the operator display area 130B.

The specific example is not limited thereto. The position and the size of the image display area 130A and those of the operator display area 130B are nonrestrictive. For example, the upper one fourth of the image list screen 130 may also be set as the operator display area 130B and the lower three fourths of the image list screen 130 may also be set as the image display area 130A, and the operator icons Ui may also be made to be displayed in the operator display area 130B. Moreover, the entire screen of the image list screen 130 may also be set as the image display area 130A, and the operator icons Ui may also be made to be displayed together with the image icons Pi in this image display area 130A.

In this case, the CPU 112 obtains the coordinates of face areas of the individual operators A to D from the camera image which has been flipped horizontally and whose resolution has been converted to that of the display 120. Then, the CPU 112 makes the operator icons UiA to UiD be displayed at positions, within the image display area 130A, corresponding to the coordinates of the face areas of the individual operators A to D, respectively.

2-8. Another Embodiment 8

In another specific example, which is described above, of the embodiment, the mobile terminal 103 is positioned outside the image-pickup area of the stereo camera 102, and the operator icon UiE corresponding to this mobile terminal 103 is displayed in the open area within the operator display area 130B.

Here, for example, the mobile terminal 103 is positioned within the image-pickup area of the stereo camera 102. Here, the CPU 112 of the TV 101 detects this mobile terminal 103 from the camera image, and obtains the position of the mobile terminal 103 within the camera image. Furthermore, the CPU 112 determines an operator's hand nearest from the viewpoint from the position of this mobile terminal 103 within a predetermined range to be the hand operating this mobile terminal 103.

In this way, the CPU 112 determines the correspondence relationship between the mobile terminal 103 and the operator who is operating this mobile terminal 103. Then, the CPU 112 makes, for example, the operator icon UiE corresponding to the mobile terminal 103 be displayed near the operator icon Ui corresponding to the operator operating this mobile terminal 103 in accordance with this correspondence relationship. Specifically, the CPU 112 makes the operator icon UiE corresponding to the mobile terminal 103 be displayed adjacently to the operator icon Ui, or be displayed so as to overlap the operator icon Ui.

In a case in which the operator operating the mobile terminal 103 can be determined in this way from among the operators captured by the stereo camera 102, the operator icon UiE corresponding to the mobile terminal 103 is made to be displayed near the operator icon Ui corresponding to this operator.

2-9. Another Embodiment 9

In another specific example, which is described above, of the embodiment, the TV 101 as an information processing apparatus is provided with the CPU 112 as a recognition unit, a control unit, and a detection unit.

The embodiment of the present invention is not limited thereto. Each of the function units (the recognition unit, the control unit, and the detection unit) of the above-described TV 101 may also be constituted by various other hardware or software as long as the function units have similar functions.

In another specific example, which is described above, of the embodiment, an embodiment of the present invention has been applied to the multiple-operator simultaneous-operation system 100 including the TV 101 and the stereo camera 102, but not limited thereto. An embodiment of the present invention may also be and can be applied to various other systems as long as the systems can be operated by a plurality of operators simultaneously. For example, an embodiment of the present invention may also be applied to a system including a personal computer, a display, and a stereo camera, and the like.

2-10. Another Embodiment 10

In another specific example, which is described above, of the embodiment, a program for executing various processing is stored in the nonvolatile memory 113 of the TV 101.

Where the program is stored is not limited thereto. This program may also be stored in a recording medium such as, for example, an optical disc or a memory card, and the CPU 112 of the TV 101 may also read the program from this recording medium. In this case, a drive for the recording medium is connected to the external interface 110 of the TV 101.

Moreover, the TV 101 may be provided with a network interface, and this program may also be downloaded via the network interface and installed in the nonvolatile memory 113.

2-11. Another Embodiment 11

Furthermore, the embodiments of the present invention are not limited to the above-described overview and specific examples of the embodiment and the other embodiments. That is, the scope of the present invention includes an embodiment in which the above-described overview and specific examples of the embodiment and the other embodiments are partially and arbitrarily combined, an embodiment in which the above-described overview and specific examples of the embodiment and the other embodiments are entirely and arbitrarily combined, and an embodiment in which the above-described overview and specific examples of the embodiment and the other embodiments are partially extracted.

Furthermore, the overview and specific examples of the above-described embodiment and the other embodiments are examples. The present invention may also be applied and can be applied to various other embodiments within the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A method for managing content presented on a display, comprising:
   receiving signals representing first and second characteristics of a user;
   presenting first and second images on the display, the first and second images being respectively associated with the first and second characteristics;
   presenting association information on the display, the association information indicating an association between the first and second images;
   determining display positions of the first and second images;
   generating a straight line between the determined display positions;
   calculating a curved line based on the straight line; and
   presenting the curved line as association information.

2. The method of claim 1, wherein the first characteristic corresponds to a face of the user and the second characteristic corresponds to a hand of the user.

3. The method of claim 1, further comprising:
   capturing image data, wherein the received signals are based on the image data;
   processing the image data to recognize the first and second characteristics of the user, wherein recognizing the first characteristic includes detecting a face of the user and recognizing the second characteristic includes detecting a hand of the user; and
   presenting an image of the face as the first image.

4. The method of claim 3, further comprising:
   presenting an image of the hand as the second image.

5. The method of claim 1, further comprising:
   storing image data corresponding to the first and second images;
   retrieving the image data after receiving the signals; and
   using the retrieved image data to present the first and second images.

6. The method of claim 1, further comprising:
   detecting movement of the user, wherein the association information is presented in response to the detected movement.

7. The method of claim 1, wherein the association information is presented as a line connecting the first and second images.

8. The method of claim 1, further comprising:
   detecting a hand gesture of the user; and
   changing the presentation of the second image based on the detected hand gesture, wherein the changed presentation of the second image indicates the hand gesture of the user.

9. The method of claim 1, wherein:
   the second characteristic corresponds to a hand of the user; and
   the method comprises:
      detecting a shape of the hand; and
      presenting the second image in one of a first configuration or second configuration based on the detected shape of the hand.

10. The method of claim 1, wherein the association information is presented as a curved line connecting the first and second images, the curved line having a vertex.

11. The method of claim 10, further comprising:
   detecting movement of the second characteristic of the user; and
   changing the presentation of the curved line based on the detected movement, wherein changing the presentation of the curved line includes changing a position of the vertex.

12. The method of claim 1, further comprising:
   monitoring a degree of movement of the user; and
   preventing presentation of the second image based on the degree of movement.

13. The method of claim 1, further comprising:
presenting the association information as a line having a display property, the line connecting the first and second images;
detecting movement of the user; and
changing the display property of the line based on the detected movement.

14. The method of claim 1, wherein changing the display property includes changing at least one of a color, a width, a length, a size, and a shape of the line.

15. The method of claim 1, further comprising:
presenting content on the display;
presenting a frame enclosing the content; and
presenting the association information as a line connecting the first and second images, wherein the frame and the line are displayed in a single display color.

16. The method of claim 1, further comprising:
presenting content on the display;
detecting a movement of the user; and
changing the presentation of the content based on the detected movement.

17. The method of claim 1, further comprising:
detecting movement of the user; and
changing the presentation of the second image when continuous movement is detected for a predetermined period of time.

18. A non-transitory computer-readable storage medium comprising instructions, which when executed on a processor, cause the processor to perform a method of managing content presented on a display, the method comprising:
receiving signals representing first and second characteristics of a user;
presenting first and second images on the display, the first and second images being respectively associated with the first and second characteristics;
presenting association information on the display, the association information indicating an association between the first and second images;
determining display positions of the first and second images;
generating a straight line between the determined display positions;
calculating a curved line based on the straight line; and
presenting the curved line as association information.

19. An apparatus for managing content displayed on a display screen, comprising:
a memory device storing instructions; and
a processing unit executing the instructions to:
receive signals representing first and second characteristics of a user;
generate a signal to present first and second images on a display, the first and second images being respectively associated with the first and second characteristics;
generate a signal to present association information on the display, the association information indicating an association between the first and second images;
determine display positions of the first and second images;
generate a straight line between the determined display positions;
calculate a curved line based on the straight line; and
present the curved line as association information.

20. The non-transitory computer-readable storage medium of claim 18, wherein the first characteristic corresponds to a face of the user and the second characteristic corresponds to a hand of the user.

21. The non-transitory computer-readable storage medium of claim 18, wherein the method further comprises:
capturing image data, wherein the received signals are based on the image data;
processing the image data to recognize the first and second characteristics of the user, wherein recognizing the first characteristic includes detecting a face of the user and recognizing the second characteristic includes detecting a hand of the user; and
presenting an image of the face as the first image.

22. The non-transitory computer-readable storage medium of claim 21, wherein the method further comprises:
presenting an image of the hand as the second image.

23. The apparatus of claim 19, wherein the first characteristic corresponds to a face of the user and the second characteristic corresponds to a hand of the user.

24. The apparatus of claim 19, wherein the processing unit further executes the instructions to:
capture image data, wherein the received signals are based on the image data;
process the image data to recognize the first and second characteristics of the user, wherein recognizing the first characteristic includes detecting a face of the user and recognizing the second characteristic includes detecting a hand of the user; and
present an image of the face as the first image.

25. The apparatus of claim 24, wherein the processing unit further executes the instructions to:
present an image of the hand as the second image.

* * * * *

UNITED STATES PATENT AND TRADEMARK OFFICE
CERTIFICATE OF CORRECTION

PATENT NO. : 8,687,845 B2  Page 1 of 1
APPLICATION NO. : 12/859060
DATED : April 1, 2014
INVENTOR(S) : Noda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 413 days.

Signed and Sealed this
Thirtieth Day of May, 2017

Michelle K. Lee
*Director of the United States Patent and Trademark Office*